United States Patent
Lindoff et al.

(10) Patent No.: US 9,693,242 B2
(45) Date of Patent: Jun. 27, 2017

(54) COMMUNICATIONS LINKS ASSESSMENT (71) Applicant: Telefonaktiebolaget L M Ericsson (publ), Stockholm (SE)

(72) Inventors: Bengt Lindoff, Bjarred (SE); Harald Gustafsson, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/888,419

(22) PCT Filed: Mar. 28, 2014

(86) PCT No.: PCT/EP2014/056289
§ 371 (c)(1),
(2) Date: Oct. 30, 2015

(87) PCT Pub. No.: WO2014/180603
PCT Pub. Date: Nov. 13, 2014

(65) Prior Publication Data
US 2016/0080951 A1   Mar. 17, 2016

(30) Foreign Application Priority Data
May 7, 2013 (EP) .................................... 13166748

(51) Int. Cl.
*H04L 12/28* (2006.01)
*H04W 24/04* (2009.01)
(Continued)

(52) U.S. Cl.
CPC .......... *H04W 24/04* (2013.01); *H04L 47/127* (2013.01); *H04L 67/12* (2013.01); *H04W 4/001* (2013.01);
(Continued)

(58) Field of Classification Search
CPC ..................................................... H04L 45/123
(Continued)

(56) References Cited

U.S. PATENT DOCUMENTS 6,055,229 A * 4/2000 Dorenbosch ......... H04B 7/2612
370/310
6,072,990 A 6/2000 Agrawal et al.
(Continued)

FOREIGN PATENT DOCUMENTS

EP   2262336 A1   12/2010

OTHER PUBLICATIONS

PCT International Search Report, mailed Jun. 5, 2014, in connection with International Application No. PCT/EP2014/056289, all pages.
PCT Written Opinion, mailed Jun. 5, 2014, in connection with International Application No. PCT/EP2014/056289, all pages.

*Primary Examiner* — Kiet Doan
(74) *Attorney, Agent, or Firm* — Leffler Intellectual Property Law, PLLC (57) ABSTRACT

There is provided a method, a communications device, a vehicle and a computer program for adaptation of operation for communication between communications devices. An application is executed by a first communications device. The application involves data communications with a second communications device. A predicted impact on at least one communications link used for the data communications is acquired. The predicted impact is based on information of current link parameters of the at least one communications link. Operation of the first communications device is adapted based on the predicted impact.

9 Claims, 3 Drawing Sheets (51) Int. Cl.
| | |
|---|---|
| *H04W 28/02* | (2009.01) |
| *H04L 12/801* | (2013.01) |
| *H04L 29/08* | (2006.01) |
| *H04W 4/00* | (2009.01) |
| *H04W 36/00* | (2009.01) |
| *H04W 36/30* | (2009.01) |
| *H04W 28/18* | (2009.01) |
| *H04W 76/04* | (2009.01) |
| *H04L 1/00* | (2006.01) |

(52) U.S. Cl.
CPC ........ *H04W 28/02* (2013.01); *H04W 36/0011* (2013.01); *H04W 36/30* (2013.01); *H04L 1/0002* (2013.01); *H04W 28/18* (2013.01); *H04W 76/04* (2013.01)

(58) Field of Classification Search
USPC ....... 455/67.11, 69, 509; 370/328, 313, 338, 370/392
See application file for complete search history.

(56) References Cited

U.S. PATENT DOCUMENTS

| | | |
|---|---|---|
| 6,141,532 A | 10/2000 | Mizuike et al. |
| 6,198,910 B1 | 3/2001 | Hanley |
| 2001/0012774 A1 | 8/2001 | Muramatsu |
| 2007/0237069 A1 | 10/2007 | Chang et al. |
| 2009/0252134 A1* | 10/2009 | Schlicht ............... H04L 1/0015 370/338 |

* cited by examiner

RAT 1    RAT 2    RAT 3

Fig. 5

COMMUNICATIONS LINKS ASSESSMENT

TECHNICAL FIELD

Embodiments presented herein relate to communication between communications devices, and particularly to a method, a communications device and a computer program for adapting operation for communication between communications devices.

BACKGROUND

In general terms, a communication system provides the necessary means for one communications device to communicate with other communications devices in the communication system. Examples of such communications devices are user equipment (UE) and network nodes. Examples of UEs are mobile phones, laptop, tablet, or stationary computers, Input/Output devices, automation controllers, electronic controller units, actuators, sensors, and machine-to-machine devices, also known as connected devices. Examples of network nodes are base station transceivers, wireless access points, gateways and servers.

The communications is based on exchanging messages on communications links established between the communications devices. These communications links may be wired, wireless, or any combination thereof. The communications may be direct communications or may be routed through one or more intermediate communications devices. The message exchange follows one or more given communications protocols. In such communication systems, there is always a challenge to obtain good performance and capacity for a given communications protocol, its parameters and the physical environment in which the communications system is deployed.

In general terms, a communication system may offer a plurality of services relating to communications between other communications devices. In general terms, the services offered relate to different types of exchange of information between the communications devices. Each service may have specific requirements on the information exchange between the communications devices. Some requirements are parameters relating to reliability, bit rate, latency, etc. Each service may also be sensitive to changes of such parameters during on-going execution of an application utilizing the service.

Actor/Data-flow modeling is a paradigm for streaming applications, such as application of a user equipment (UE) for distributed computing and parallel platforms in general. This constrained programming model benefits high-level transformations and facilitates code optimizations and run-time deployment. The programming model allows for one application to be distributed over several different communications devices, for example by deploying one or several actors or application modules in an application on different available software servers. The software servers may be implemented in a server, a base station transceiver, a micro data center (MDC) which may comprise a collection of servers associated with a base station transceiver, or a UE.

In the dataflow paradigm a program or application is described as a graph of actors or application modules, also known as function units, that communicate asynchronously using message passing, so-called tokens. The actor can have internal state information indicating the current internal state of the application, that is the current code segment being executed and the value(s) stored in any associated processor registers and possibly other control data for various parameters or variables. The programming model is a natural fit for many traditional Digital Signal Processing applications such as audio and video coding, radio base band algorithms, cryptography applications, automation, etc. Data flow decouples the program specification from the available level of parallelism in the executing hardware since the actual mapping of tasks onto threads, processes, cores and devices possibly is not done in the application code but in the compilation and deployment phase. The designer of the application is thus not required to know the actual structure of the executing hardware system. This is beneficial in designing application that are to be used in varying infrastructures such as differing models and makes for communication terminals, different network infrastructures and varying communication modes.

The application is divided into application modules and distributed to various network nodes which execute their application modules according to an actor-dataflow model. Other examples of computational models are server-client model, Model-View-Controller (MVC) model, peer-to-peer model, etc. The communications devices executing applications may use methods according to the above for distributing the application over several communications devices.

However, there is still a need for improved communications between communications devices.

SUMMARY

An object of embodiments herein is to provide improved communications between communications devices The inventors of the enclosed embodiments have realized that when deploying automation control or monitoring systems, etc. over a varying communications link it is desirable to handle situations of link failure as quickly as possible to avoid failing applications. The inventors of the enclosed embodiments have further realized that especially for low latency applications currently used methods are not fast enough to handle the risk of reduced communications link performance. The inventors of the enclosed embodiments have therefore concluded that it could be beneficial to predict future link performance, such as quality degradation using current link parameters, especially for low latency applications.

A particular object is therefore to provide improved communications between communications devices based on operation adaption of at least one communications device participating in the communications.

According to a first aspect there is presented a method of adapting operation for communication between communications devices. The method is performed by a first communications device. The method comprises executing an application, wherein the application involves data communications with a second communications device. The method comprises acquiring a predicted impact on at least one communications link used for said data communications, the predicted impact being based on information of current link parameters of said at least one communications link. The method comprises adapting operation of the first communications device based on the predicted impact.

Advantageously this reduces the time to handle a potential problem with at least one communications link between two communications devices executing (parts of) an application. The time point for adapting any operation is thus provided with a predicted impact and moved from after the application is affected to before it is affected. In turn, this enables execution of critical applications with low latency requirements over unreliable communication links.

According to a second aspect there is presented a first communications device for adapting operation for communication between communications devices. The first communications device comprises a processing unit arranged to execute an application, wherein the application involves data communications with a second communications device. The first communications device comprises a communications interface arranged to acquire a predicted impact on at least one communications link used for said data communications, the predicted impact being based on information of current link parameters of said at least one communications link. The processing unit is further arranged to adapt operation of the first communications device based on the predicted impact.

According to a third aspect there is presented a vehicle. The vehicle comprises a first communications device according to the second aspect.

According to a fourth aspect there is presented a computer program for adapting operation for communication between communications devices, the computer program comprising computer program code which, when run on a first communications device, causes the first communications device to perform a method according to the first aspect.

According to a fifth aspect there is presented a computer program product comprising a computer program according to the fourth aspect and a computer readable means on which the computer program is stored.

It is to be noted that any feature of the first, second, third, fourth and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed by the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
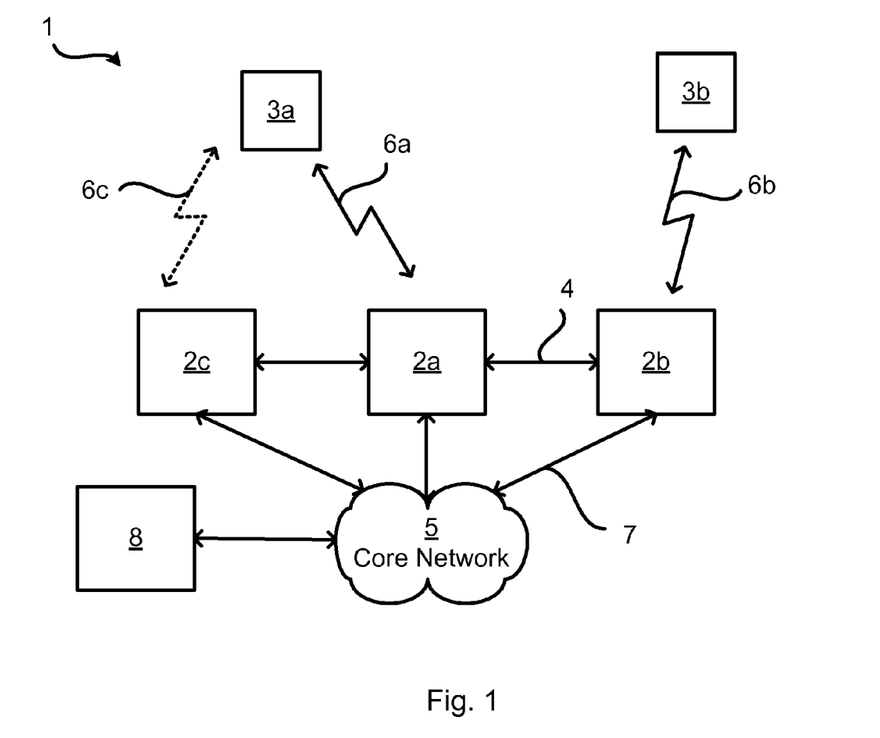
FIG. 1 is a schematic diagram illustrating a communications system where embodiments presented herein may be applied.

FIG. 1 is a schematic diagram illustrating a communications system 1 where embodiments presented herein can be applied. The communications system 1 comprises a first communications device embodied as a first user equipment 3a and a second communications device embodied as a second user equipment 3b. The first communications device and the second communications device are arranged to communicate with further communications devices embodied as network nodes 2a, 2b, 2c by communications links 6a, 6b, 6c being established between the UE 3a-b and the network nodes 2a-c. Further, the network nodes 2a-c are arranged to communicate with other network nodes 2a-c via communications links, one of which is identified by reference numeral 4. The network nodes 2a-c are also operatively connected to a core network 5 via communications links, one of which is identified by reference numeral 7. The core network 5 may provide services and data to the communications devices operatively connected thereto. The communications system 1 may further comprise a server 8, such as an applications server or web server, operatively connected to the core network 5. The communications links 6a-6c, 4, 7 may be wired, wireless or any combination thereof. According to one embodiment the communications links 6a-b are wireless radio links and the communications link 4 is compliant with the X2 interface and the communications link 7 is compliant with the S1 interface as used in LTE.

The communications system 1 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, wired communications, such as Ethernet, etc., as long as the principles described hereinafter are applicable.

According to the communications system 1, any communications between the UE 3a and the UE 3b may be routed via at least one network node 2a-c. However, the UE 3a and the UE 3b may be arranged for direct communications utilizing, for example, a short-range communications interface, such as the Bluetooth short-range radio interface or WiFi direct. The embodiments disclosed herein are not limited in this respect.

Figure 5:
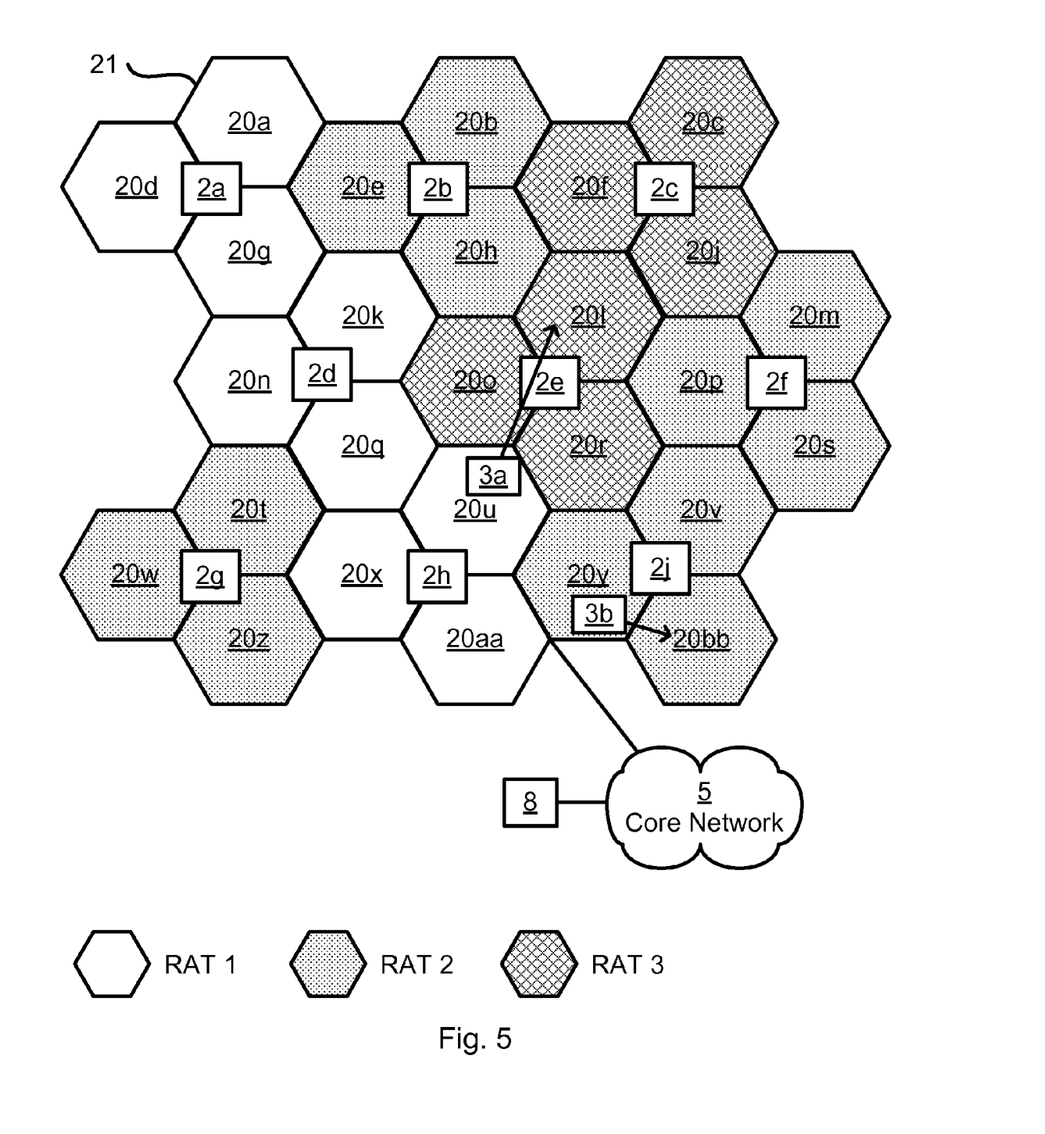
FIG. 5 is a schematic diagram illustrating a cellular communications system where embodiments presented herein may be applied.

FIG. 5 illustrates part of a cellular communications system 21 where embodiments presented herein can be applied. The cellular communications system 21 comprises network nodes 2a, 2b, . . . , 2j providing network coverage over cells 20a, 20b, . . . , 20bb. Each cell 2a-bb is served by at least one of the network nodes 2a-j. A UE 3a, 3b, positioned in a particular cell is thus provided network service by the network node 2a-j serving that particular cell. The cellular communications system 21 is further operatively connected to a server 8 via a core network 5.

Cellular Radio Access Technologies (RAT) are typical technologies for radio access. Coverage of advanced mobile broadband systems, such as 4G (LTE) are deployed gradually, typically first in so-called Hotspots and in urban locations. 4G LTE has a throughput performance in the range 50-100 Mbits/s. 4G LTE also enables low latency; connection setup latency is in the range of 100-200 ms, and 10-15 ms in connected mode (ping time). Thus, for a UE 3a and a UE 3b located within coverage of a network node providing 4G LTE RAT this would imply that high performance latency applications between UE 3a and UE 3b could be used.

Once outside 4G coverage the UEs 3a-b often can rely on older technologies, such as 3G (such as WCDMA and/or HSPA). Such technologies generally have a maximum performance of some 10ths of Mbits/s as well as a latency in the order of 0.5-1 second for setup and 40-100 ms in connected mode (ping time). In rural areas, typically only 2G services (such as GSM, GPRS and/or EDGE) may be available. For 2G services the throughput performance is in the range of 100 kbits/s and the latency is in the order of 2 seconds (setup) and 400-500 ms in connected mode (ping time). Hence in rural areas the applications could only be executed assuming moderate link performance. In even more sparsely populated places there may be no coverage at all, and hence communication between UE 3a and UE 3b may not be possible.

As schematically illustrated in FIG. 5 the cellular communications system 21 provides three different RATs. For example, cells 20a, 20d and 20g offer network access using a first RAT (RAT 1); cells 20b, 20e and 20h offer network access using a second RAT (RAT 2); and cells 20c, 20f and 20j offer network access using a third RAT (RAT 3). Without losing generality it will for illustrative purposes assumed that RAT 1 is 4G LTE, RAT 2 is 3G and RAT 3 is 2G.

Furthermore, cellular radio access technologies are generally designed for mobility purposes (i.e., for UEs 3a-b moving from one location to another whilst being operatively connected to the cellular communications system 21), and hence on the radio access link layer there are provided procedures for controlling current signal strength to the current serving cell in order to verify whether there is a reliable connection to the current serving network node or not. Hence, there is provided radio-link monitoring (RLM), as well as procedures for monitoring neighboring cells as possible handover candidates—both within the currently used RAT as well as other possible RATs currently within coverage of the UE 3a-b.

The above disclosed properties and considerations of the different RATs, RANs, and RLM are taken into account in this disclosure.

When performing communications between two communications devices, such as between UE 3a and UE 3b, the performance may depend on current conditions of the communications links 6a-c, 4, 7. For example, in applications relating to communications over communications links with conditions that change over time, such as wireless radio links, it may be difficult to handle low latency applications due to the risk of transmissions not succeeding during a specified time period. For applications which have less requirements on low latency any message to be transmitted may be queued and sent when possible. The latter is typically referred to as store-and-forward. The applications may detect a link failure by transmitting a beacon signal and detecting an acknowledgement (e.g. as a ping message). Likewise, application specific messages anyway needing transmission can also take the role as ping messages. Yet other applications may have knowledge of the amount of messages that should be received during a time period and hence be arranged to react when a lower amount of messages/acknowledgements have been received within the time period. Further, UEs 3a-b and network nodes 2a-c may be arranged to evaluate the transmission link performance by for example considering the signal level of messages as exchanged between the UEs 3a-b and the network nodes 2a-c. The network node 2a-c and the UEs 3a-b also have knowledge of which Radio Access Technology (RAT) that is used. In general terms, between two communications devices, two communications links may exist; one transmit link and one receive link. Depending on the communications devices involved, one of the transmit link and the receive link may be an uplink and the other of the transmit link and the receive link may be a downlink. In general terms, an uplink (UL) refers to a communications link used for signalling from a UE 3a-d to a network node 2a-c, and a downlink (DL) refers to a communications link used for signalling from a network node 2a-c to a UE 3a-b.

The embodiments disclosed herein relate to adapting operation for communication between communications devices. In order to obtain adaptation of operation for communication between communications devices there is provided a first communications device, a method performed by the first communications device, a computer program comprising code, for example in the form of a computer program product, that when run on the first communications device causes the communications device to perform the method.

Figure 2:
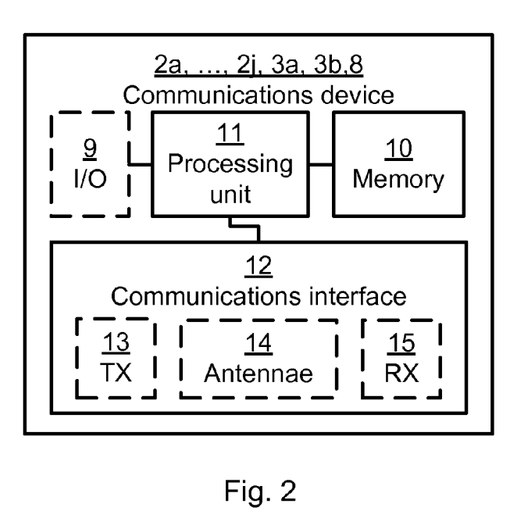
FIG. 2 is a schematic diagram showing functional modules of a communications device.

FIG. 2 schematically illustrates, in terms of a number of functional modules, the components of a communications device 2a, 2b, 2c, 2d, 2e, 2f, 2g, 2h, 2j, 3a, 3b, 8. The communications device of FIG. 2 may comprise functional blocks, provided by hardware, software, or as a combination thereof, which may enable the communications device to perform the disclosed functionality, method steps, etc., associated with the herein described first communications device. A processing unit 11 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 16 (as in FIG. 3), e.g. in the form of a memory 10. Thus the processing unit 11 is thereby arranged to execute methods as herein disclosed. The memory 10 may also comprise persistent storage, which, for example, can be any single one or combination of magnetic memory, optical memory, solid state memory or even remotely mounted memory. The communications device may further comprise an input/output (I/O) interface 9 for example for receiving data from and/or providing data to a display, touch screen, keys, relays, sensors (such as for acceleration, position, pressure, temperature, voltage, current, light, etc), motor controllers, solenoid controllers, etc. The communications device also comprises a communications interface 12 for communication with other communications device, such as servers 8, network nodes 2a-c and wireless devices 3a-b. The communications interface 12 may comprise one or more transmitters (TX) 13 and receivers (RX) 15, comprising analogue and digital components and optionally a suitable number of antennae 14 for radio communication. The processing unit 11 controls the general operation of the communications device, e.g. by sending control signals to the memory 10, the I/O interface 9, and the communications interface 12 and receiving information from the memory 10, the I/O interface 9, and the communications interface 12. Other components, as well as the related functionality, of the communications device are omitted in order not to obscure the concepts presented herein.

Figure 3:
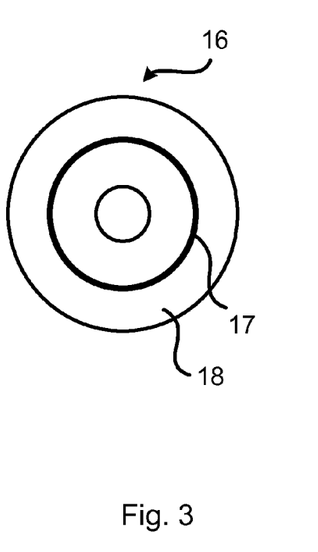
FIG. 3 shows one example of a computer program product comprising computer readable means.
Figures 6, 7:
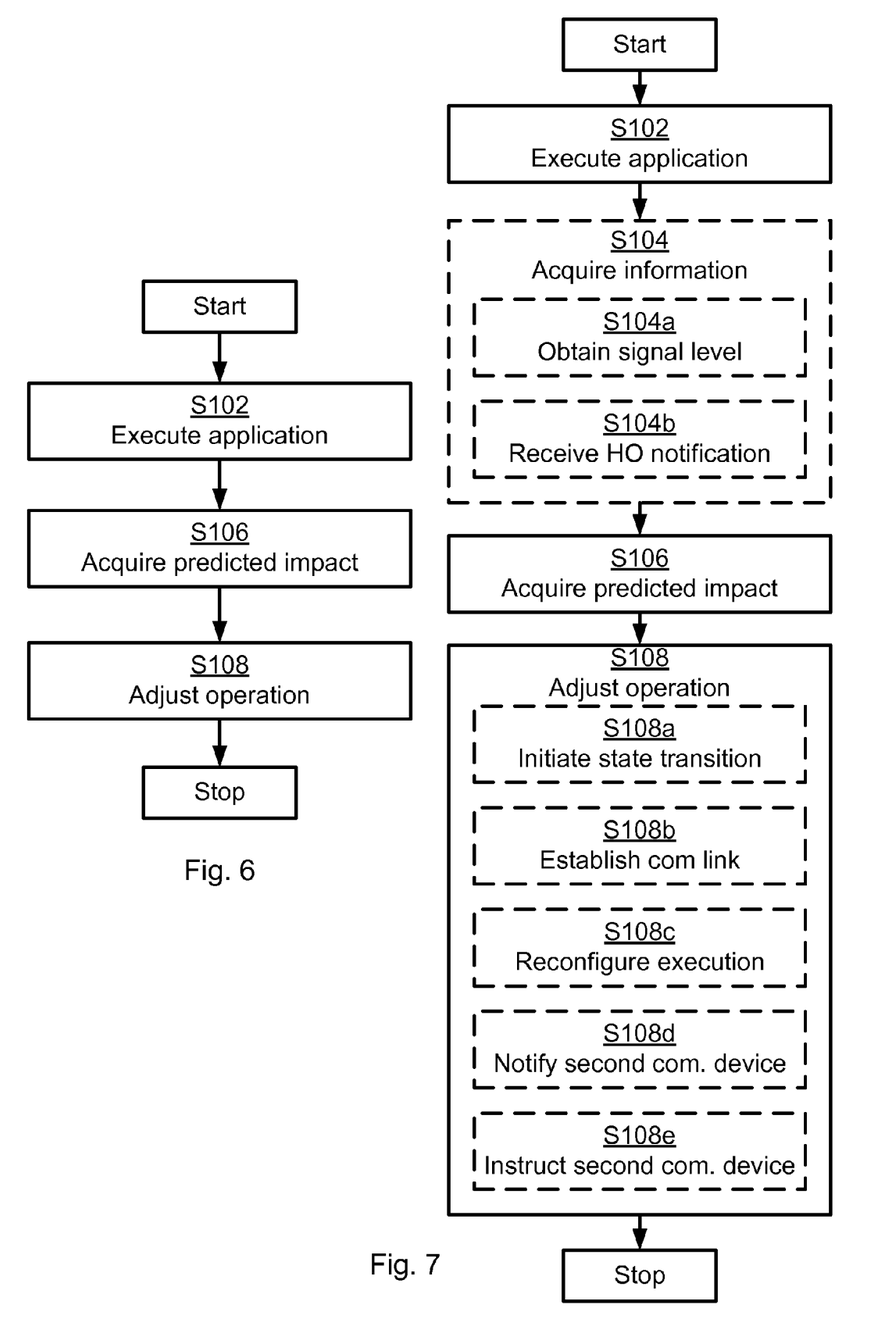
FIGS. 6 and 7 are flowcharts of methods according to embodiments presented herein.

FIGS. 6 and 7 are flow charts illustrating embodiments of methods for adapting operation for communication between communications devices. The methods of FIGS. 6 and 7 are performed by a first communications device. The methods are advantageously provided as computer programs 17. FIG. 3 shows one example of a computer program product 16 comprising computer readable means 18. On this computer readable means 18, at least one computer program 17 can be stored, which at least one computer program 17 can cause the processing unit 11 and thereto operatively coupled entities and devices, such as the memory 10, the I/O interface 9, and/or the communications interface 12 to execute methods according to embodiments described herein. In the example of FIG. 3, the computer program product 16 is illustrated as an optical disc, such as a CD (compact disc) or a DVD (digital versatile disc) or a Blu-Ray disc. The computer program product 16 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory, a flash memory or a hard disk. Thus, while the at least one computer program 17 is here schematically shown as a track on the depicted optical disk, the at least one computer program 17 can be stored in any way which is suitable for the computer program product 16.

Figure 4:
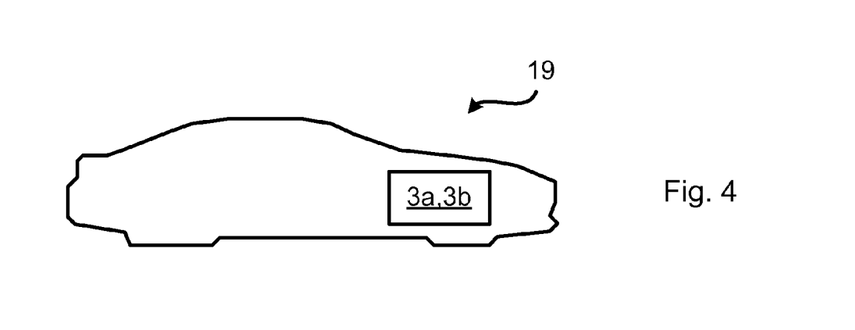
FIG. 4 schematically illustrates one example of a vehicle according to embodiments.

FIG. 4 schematically illustrates a vehicle 18 comprising a communications device as herein disclosed. Although the vehicle 18 in FIG. 4 schematically is been illustrated as a ground vehicle (a car), the vehicle 18 may be any vehicle comprising a communications device as herein disclosed. For example, the vehicle 18 may be a ground or underground vehicle (such as a car, a truck, a train, a mining vehicle), an airborne vehicle (such as a helicopter, airplane, or satellite), a ship, a boat or a submarine. The vehicle may be unmanned or manned and be arranged for transportation of persons, goods or animals.

A method of adapting operation for communication between communications devices as performed by a first communications device, comprises executing, in a step S102, an application. The first communications device may be either a UE 3a, 3b, a network node 2a-j or a server 8. The application is executed by the processing unit 11. In general terms, an application as executed by the first communications device may comprise different pieces of software, modules or constitute separate applications as executed by other communications devices. Examples of applications will be provided below. The application involves data communications with a second communications device. The second communications device may be another UE 3a, 3b, another network node 2a-j or another server 8.

In general terms, the term communications link as herein used refer to a physical communications link and not a logical communications link. Communications over a logical communications link between two communications devices may involve communications over a plurality of physical communications links. For example, a logical communications link between a first UE and a second UE may comprise a first physical communications link between the first UE and a first network node, a second physical communications link between the first network node and a second network node and a third physical communications link between the second network node and the second UE.

Further, as noted above the application involves data communications. However, in general terms, actual data does not necessarily have to be communicated before, during, or after any steps as disclosed herein are performed.

As will be further disclosed below, it may be so that the operation of the application is adapted so that data transmission is disabled. For example a communications device that needs to send an alarm may under normal operation conditions (i.e. when an alarm is not issued) not have a need for data communications to another communications device, but need to know whether to establish a communications links or adapt its operation otherwise if an alarm is issued.

The embodiments presented herein are based on utilizing the fact that on radio access link layer level there are several parameters and procedures defined for determination of the wireless link performance. For example, parameters such as signal strength measurements, current used RATs, events related to whether there is a need to handover a communications device to another cell and/or RAT as well as the radio link quality are monitored by the communications interface 12.

In order to enable, for example, low latency applications, to quickly handle link quality reductions a link risk assessment may be introduced. The link risk assessment may be represented by a predicted impact on at least one communications link 6a, 6b used for the data communications. An application executed by the first communications device may thus determine a link risk assessment (for example at least of the receive link but also of the transmission link) and transmit this information to dependent related applications executed by other communications devices such as the second communications device.

The application may alternatively be configured to obtain link risk assessments from at least one other communications device executing the application. The communications interface 12 of the first communications device may therefore be arranged to, in an optional step S104, acquire information of current link parameters of the at least one communications link. There may be different ways of acquiring this information. For example, the communications interface 12 of the first communications device may be arranged to, in an optional step S104a, obtain a signal quality (such as, but not limited to: signal level signal to noise ratio, block error, and/or bit error rate) of the at least one communications link used. For example, the communications interface 12 of the first communications device may be arranged to, in an optional step S104b, receive a handover notification. For example, the communications interface 12 of the first communications device may be arranged to, in an optional step S104c, obtain radio access technology information related to the at least one communications link used.

The application as executed by the first communications device may be configured to, based on the assessments, as for example obtained or received in steps S104, S104a, S104b, and/or S104c, determine a predicted impact on the at least one of the communications links. Particularly, the communications interface 12 of the first communications device is arranged to, in a step S106, acquire a predicted impact on at least one communications link 6a, 6b used for the data communications. The predicted impact is based on information of current link parameters of the at least one communications link 6a, 6b.

Particularly, the predicted impact may occur on at least one communications link 6a, 6b being either remote from the first communications device or local to the first communications device. For example, the predicted impact may occur on communications link 6b which is remote from UE 3a acting as the first communications device or on communications link 6a which is local to UE 3a acting as the first communications device. That is, according to an embodiment at least one of the at least one communications link is a wireless communications link 6b remote from the first communications device; according to an embodiment at least one of the at least one communications link is a wireless communications link 6a local to the first communications device.

Further, typically a UEs 3a-b monitor the DL (and network nodes 2a-j monitor the UL), but the herein disclosed embodiments also consider monitoring the UL by the UE 3a-b when acting as a first and/or second communications device. This may be accomplished by the UE 3a-b receiving information about UL performance from the network node 2a-j, or by the UE 3a-b autonomously determining the UL performance, for example by monitoring the needed UL TX power for a given data rate. High UL power and low data rate may imply close to out-of-coverage. The network node 2a-j may in turn autonomously determine DL performance, e.g., by determining that a UE 3a-b assumed to be operatively connected to the network node 2a-j no longer acknowledges paging or other dedicated messages as transmitted by the network node 2a-j. That is, according to an embodiment the current link parameters concern properties of a wireless uplink communications link and/or of a wireless downlink communications link.

In summary, the predicted impact may occur on any combination of a remote DL, a remote UL, a local DL, and a local UL.

This link risk assessments may thus be calculated by obtaining information on current RAT in use in the different communications links, signal level and optionally measurements of signal level to neighboring cells (of same or different RAT). This collected information may then be combined and based on the combination an achieved possible link quality may be determined. The combination may in some embodiments be based on "the worst case link" (i.e., if one communications link only is 2G compliant, then application performance related to 2G is used, even in applications executed by communications devices operatively connected to a node with a higher quality (say, 4G) link). The link risk assessment need only be transferred when it has changed from previous assessments, if such exists.

The prediction enables handling of potential degradations of communications links before the degradations also impact the application's performance. The processing unit 11 of the first communications device is therefore arranged to, in a step S108, adapt operation of the first communications device based on the predicted impact.

As will be further disclosed below, one scenario where the herein inventive concept may readily apply relates to automation control and monitoring applications. In such a scenario the application may operate in an unsafe condition when relying on wrong information due to missed information, i.e., by not taking into consideration the predicted impact. The predicted reduced link performance can be either risk of losing a link completely or a change of RAT that, for example, may reduce the transmission (data rate) speed of the communications link and/or increase the communications link latency.

The determination in step S108 may be translated into a change of application state. That is, the processing unit may be arranged to, in an optional step S108a, initiate state transition to an operation state of the application associated with the predicted impact. Hence, by measuring link performance (i.e. the parameters as disclosed above) and informing dependent related parts of the application about these parameters, events etc., the application may be configured to change its operating state so as to handle the predicted reduced link performance. The application may thus enter a state that sufficiently handles the predicted risk of the reduced performance of the communications link. There are many examples of actions which the application may be configured to perform. These actions may in turn be executed by the communications device executing the application.

One such example concerns performing a change of RAT that will reduce the transmission speed or increase the latency. The communications interface 12 of the first communications device may therefore be arranged to, in an optional step S108b, establish at least one further communications link 6c to be used for the data communications. The further communications link 6c may thus be associated with another RAT than the previously used communications link 6a.

One further example concerns the risk of a complete drop of a communications link—without the possibility to establish a further communications link (either to establish a further communications link as such, or to establish a further communications link fulfilling the requirements of the application being executed). The operation adjustment in step S108 may involve updating control/monitoring configurations, go to a safe state (such as halt any movement of the first communications device), go to autonomous control (such as the first communications device only relying on local sensors), establish an alternative communication channel (such as establishing a point-to-point communication with the second communications device, if possible), choose an alternative travelling route for the first communications device. The processing unit 11 of the first communications device may therefore be arranged to, in an optional step S108c, reconfigure the execution of the application in such a way.

One further example concerns instructing other related application to update their control/monitoring configurations or completely change the application. The communications interface 12 of the first communications device may therefore be arranged to, in an optional step S108d, notify the second communications device of the predicted impact. The communications interface 12 of the first communications device may further be arranged to, in an optional step S108e, instruct the second communications device to, based on the predicted impact, perform reconfiguration of its own execution of the application (i.e., as executed by the second communications device).

Examples of further embodiments of the herein disclosed inventive concept are provided next with references to FIG. 5.

It is assumed that an application is executed, as in step S102, in each UE 3a, 3b. For illustrative purposes it is further assumed that the application executed in UE 3a is in operative contact (potentially via an application being executed in the server 8) with an application executed in UE 3b. It is also possible for applications executed on UE 3a and UE 3b to have their communication routed directly without the need of an application being executed on the server 8. During data communication with the network nodes 2a-c, all communications devices associated with the application may monitor the radio link to the connected network node (i.e., serving cell) in order to verify whether that the communications link 6a-b according to one or more criterion is sufficiently good (RLM) or not for providing the necessary means for communications between UE 3a and UE 3b.

For illustrative purposes it is firstly assumed that UE 3a currently is served by a 4G LTE cell and thus operatively connected to a network node enabling a 4G LTE compliant communications link (not shown in FIG. 5) to be established. Information regarding this communications link, or an assessment thereof, may be sent to related applications executed on the server 8 and/or the UE 3b. For illustrative purposes it is further assumed that UE 3b currently is served by a 3G cell and thus operatively connected to a network node enabling a 3G compliant communications link (not shown in FIG. 5) to be established. Information regarding this communications link, or an assessment thereof, may be sent to related applications executed on the server 8 and/or the UE 3a. Information regarding the communications links of UE 3a and UE 3b may thus be taken into account for determination of link level performance between applications executed by UE 3a and UE 3b. As schematically illustrated in FIG. 5, UE 3a is currently served by cell 20U (supporting RAT 1) and is moving towards cell 200 (supporting RAT 3) and further towards cell 201 (also offering RAT 3). As is further schematically illustrated in FIG. 5, UE 3b is currently served by cell 20y (offering RAT 2) and is moving towards cell 20bb (also supporting RAT 2).

UE 3a is thus moving out of 4G coverage in cell 20U and an adjacent cell 200 is detected supporting only 2G. On RAN level, this may be detected by that the signal level going below a first threshold for the 4G connection. This may result in an event (denoted event I) that in turn is reported to the serving network node 2h, that then in turn orders the UE 3a to start performing measurements on a neighboring 2G cell (typically deployed on another carrier frequency). On regular basis (for example in inter-frequency measurement gaps of 6 ms every 40 or 800 ms) UE 3a may monitor the 2G signal strength (i.e. the signal strength of a potential communications link between UE 3a and a 2G compliant network node 2e and once the 4G signal strength (i.e. the signal strength of the communications link between UE 3a and the serving 4G compliant network node 2h) is below a second threshold a handover (HO) is triggered and the network node 2h initiates a HO to the network node 2e of the 2G cell 200 (denoted event II). The HO decision may also require the 2G signal strength to be above a third threshold. From an application perspective, the application being executed by UE 3a may be configured to use the start of the Inter-RAT measurement (i.e., event I) as an indicator to form a link level assessment to be sent to other communications devices executing the application, such as UE 3b and/or the server 8. The application being executed by UE 3a may also be configured to determine operation adaption, as in any of steps S108, S108a, S108b, S108c, S108d, S108e, based on the link risk assessment. The application being executed by UE 3a may further be configured to at a subsequent point in time report the HO event (i.e., event II) to other communications devices executing the application, such as UE 3b and/or the server 8. This may trigger further operation adaption of the application. Since these assessments may be communicated to the application being executed by UE 3b, it may possibly also change the operation state of the application being executed by UE 3b.

For illustrative purposes it is secondly assumed that for UE 3b executing the application, as in step S102, there are no neighboring cells providing a high quality communications link and further that the cell coverage border is close to the UE 3b. Out of coverage may be defined as the lowest signal level for reliable communication with the network node. In general terms, this level is RAT and carrier frequency (frequency band) specific, and may also be measured in different ways. For example, for GSM (at 900 MHz) it may correspond to a received signal strength indicator (RSSI), i.e., total signal strength, below around −109 dBm. For WCDMA/HSPA (Band 1, 2 GHz) it may correspond to a received signal code power (RSCP) on a common pilot channel (CPICH) below −119 dBm. For LTE it may correspond to a Reference Signal Received Power (RSRP), i.e., a Common Reference Signal power, below −121 dBm (Band 1). Since such information is by the UE 3b known before hand, the out-of-coverage (or out-of-sync) levels can be stored in a table in the memory to of the UE 3b and accessed by the application during execution of the same. Once the UE 3b measures a low signal level, such as a few dB above the out-of-coverage level, the UE 3b may report that to other communications devices executing the application, such as UE 3a and/or the server 8. The applications executed by UE 3a, UE 3b or by the server 8 may determine a possibly new operation state of the application, which e.g. enables fail safe procedures, in case UE 3b (in a near future) will go out-of-coverage and thus into a state where an operational connection between the application executed by UE 3a and the application executed by UE 3b is not possible anymore.

Examples of scenarios where the herein disclosed embodiments may readily apply are provided next. However, as the skilled person understands, the herein disclosed inventive concept is not limited by these scenarios which are provided for illustrational purposes only.

A first scenario relates to communications devices being part of sensor devices. In general terms, sensors are arranged to collect data by measuring a physical quantity and converting the measurement into a signal. The signal may then be provided to an observer, data storage, or other device for further processing. Sensor devices may collect data relating to location, speed, temperature, pressure, still or video image, etc. It is assumed that the application is configured to operate in at least a first operating state and a second operating state. The first operating state is associated with a first data transfer rate of the communications device and the second operating state is associated with a second data transfer rate of the communications device. Without losing generality it is assumed that the first data transfer rate is higher than the second data transfer rate. The second data transfer rate may correspond to a complete loss of link. In a first operating state the application being executed (as in step S102) by the communications device of the sensor device may be configured to collect and directly transfer data representative of its currently measured location, speed, temperature, pressure, and or currently captured still or video image. In a second operating state the application being executed by the communications device of the sensor device may be configured to only calculate data representative of a source location and a destination location, its maximum and/or minimum measured speed, temperature, and pressure within a given time duration. The communications device part of the sensor is arranged to, during its execution of the application, acquire a predicted impact on at least one communications link used for data communications between the sensor and a further communications device (as in step S106). The application may be configured to, during a state transition (as in step S108a) from the second operating state to the first operating state transfer the collected data. The application may have access only to a limited memory and may therefore be configured to alter its data collection procedure from storing actual collected measurement samples to storing only statistics of the collected measurement samples in the memory of the sensor device when being executed in the second operating state. Otherwise, if the application instead had been configured for a timeout failure, the application would not be able to store all collected measurements before running out of memory. There may optionally be a third operating state intermediate in relation to the first operating state and the second operating state. The intermediate operating state may be associated with a data transfer rate lower than the first but higher than a data transfer rate corresponding to a complete loss of link. The application may be configured to, in the intermediate operating state, transfer statistics of the collected measurement samples. As the skilled person understands there may be further intermediate operating states and data transfer rates.

A second scenario relates to communications devices being part of (un)manned vehicles. Consider an (un)manned aerial vehicle ([U/M]AV) used for surveillance of an area. For communications with other communications devices the UAV may have established a communications link to at least one network node. An application is configured to extract relevant information from surveillance information. The application is executed (as in step S102) by the UAV as well as by a remote server; the information extraction may be performed by the remote server. Additionally, the extracted information may be communicated to at least one further vehicle located in the surveyed area and which comprises a further communications device and which may thus also execute the application. Hence this scenario is representative of an embodiment where there is a communications link between the UAV and the network node, a communications link between the network node and the server, communications link between the server and a further network node, and communications link between the further network node and the further vehicle. The further vehicle is thus dependent on that the UAV has reliable communications links to the server for best performance. The application executed by the further vehicle may be so configured that when the further vehicle acquires remote link risk assessments for the communications links between the UAV, its serving network node and the server (by acquiring a predicted impact on any of these communications links, as in step S106) the application enters an operating state corresponding to a limited-surveillance state (as in step S108a)—even if the communications links between the further vehicle, its serving network node, and the server fulfil necessary requirements. The application could, in the limited-surveillance state, be configured to instruct the further vehicle to reinforce protection or to actively seek shelter. As the skilled person understands, there may be a plurality of further vehicles, each of which could be an unmanned mobile vehicle. Further, a communications device could be provided in a manned vehicle that when executes the application informs the driver of the limited-surveillance state. Additionally if the performance of the communications links from the UAV are degraded but not completely dropped the application executed by the communications device in the UAV could switch to an operating state (as in step S108a) where, instead of transmitting information such as still or video images, only information relating to whether the area under surveillance is clear or not is transmitted to the remote server.

Likewise, the application as executed (as in step S102) by the communications device in the further vehicle may be configured to take a decision regarding adaption of its operation (such as state transitions) based on the remote link assessments (as in steps S104, S106, and S108).

A third scenario relates to communications devices with a remote control application. In such a scenario two communications devices executing a remote control application (as in step S102) may, for example for energy reasons, in a first operating state of the application communicate over a short-range radio link. The two communications devices may need to switch (as in step S108a) to communications in a cellular communications system, corresponding to a second operating state of the executed application, when there is a risk of losing control due to link assessments (as acquired by performing step S106) of the short-range radio link.

A fourth scenario relates to a communications devices being part of a surveillance system. In general terms, a surveillance system may comprise multiple communications devices that (overlappingly) monitor an area. For example, when the communications devices are maliciously attacked by e.g. a radio jammer, the remote radio link assessments may be collected (as in steps S104 and S106) by a central supervision part of the application, for example as executed in server. During execution of the supervision (as in step S102) a drop in link assessment of any of the communications devices executing the application may be detected (as in step S104 and S106). Operation may then be switched to an operating state (as in step S108a) of the application being an alert state and further additional communications devices may be deployed to survey the area. Hence, the supervisory application (for example as executed in server) does thereby not need to wait for a timeout from the communications devices and may instead directly perform an action associated with the alert state.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, the term application as herein used also includes application modules, application libraries, application frameworks, application middleware, application runtime, and application level virtual machines (VM) such as Java VM, etc. Further, messages transmitted between one communications device and another communications device as well as messages transmitted between one communications device and a server may be transmitted using Internet Protocol (IP) messages, Transmission Control Protocol/Internet Protocol (TCP/IP) messages, or User Datagram Protocol (UDP) messages.

The invention claimed is:

1. A method of adapting operation for communication between communications devices, the method being performed by a first communications device, comprising the steps of:
   executing an application, wherein the application involves data communications with a second communications device;
   using one or more communications links for the data communications with the second communications device;
   acquiring a predicted impact on at least one of the communications links used for said data communications, the predicted impact being acquired before a performance level of the application is impacted, and the predicted impact being based on information of current link parameters of said at least one of the communications links;
   adapting operation of the first communications device based on the predicted impact by performing one or more of:
      establishing at least one further communications link to be used for said data communications;
      reconfiguring the execution of the application;
      notifying the second communications device of the predicted impact; and instructing the second communications device to, based on the predicted impact, perform reconfiguration of its own execution of the application; and acquiring said information of said current link parameters of said at least one of the communications links, wherein said acquiring information comprises one or more of:
- obtaining a signal quality of the at least one of the communications links used;
- receiving a handover notification; and
- obtaining radio access technology information related to the at least one of the communications links used.

2. The method according to claim 1, wherein said adapting further comprises:
initiating state transition to an operation state of the application associated with the predicted impact.

3. The method according to claim 1, wherein at least one of the at least one of the communications links is a wireless communications link remote from the first communications device.

4. The method according to claim 1, wherein at least one of the at least one of the communications links is a wireless communications link local to the first communications device.

5. The method according to claim 1, wherein the current link parameters concern properties of a wireless uplink communications link and/or of a wireless downlink communications link.

6. A first communications device for adapting operation for communication between communications devices, comprising:
a processing unit arranged to execute an application, wherein the application involves data communications with a second communications device;
the processing unit being further arranged to use one or more communications links for the data communications with the second communications device;
a communications interface arranged to acquire a predicted impact on at least one of the communications links used for said data communications, the predicted impact being acquired before a performance level of the application is impacted, and the predicted impact being based on information of current link parameters of said at least one of the communications links;
the processing unit further being arranged to adapt operation of the first communications device based on the predicted impact by being arranged to perform one or more of:
- establish at least one further communications link to be used for said data communications;
- reconfigure the execution of the application;
- notify the second communications device of the predicted impact; and
- instruct the second communications device to, based on the predicted impact, perform reconfiguration of its own execution of the application; and the processing unit being further arranged to acquire said information of said current link parameters of said at least one of the communications links by being arranged to perform one or more of:
- obtain a signal quality of the at least one of the communications links used;
- receive a handover notification; and
- obtain radio access technology information related to the at least one of the communications links used.

7. The first communications device according to claim 6, wherein the processing unit is, in order to adapt said operation, further arranged to:
initiate state transition to an operation state of the application associated with the predicted impact.

8. A vehicle comprising a first communications device according to claim 6.

9. A nontransitory computer readable storage medium comprising a computer program for adapting operation for communication between communications devices, the computer program comprising computer program code which, when run on a first communications device, causes the first communications device to:
execute an application, wherein the application involves data communications with a second communications device;
use one or more communications links for the data communications with the second communications device;
acquire a predicted impact on at least one of the communications links used for said data communications, the predicted impact being acquired before a performance level of the application is impacted, and the predicted impact being based on information of current link parameters of said at least one of the communications links;
adapt operation of the first communications device based on the predicted impact by performing one or more of:
- establishing at least one further communications link to be used for said data communications;
- reconfiguring the execution of the application;
- notifying the second communications device of the predicted impact; and
- instructing the second communications device to, based on the predicted impact, perform reconfiguration of its own execution of the application; and acquire said information of said current link parameters of said at least one of the communications links, wherein said acquiring information comprises one or more of:
- obtaining a signal quality of the at least one of the communications links used;
- receiving a handover notification; and
- obtaining radio access technology information related to the at least one of the communications links used.

* * * * *